Oct. 12, 1965 C. S. HERRICK 3,212,038
WALL MOUNTED LIGHT DIMMING VARIABLE REACTOR DEVICE
Filed Feb. 1, 1963
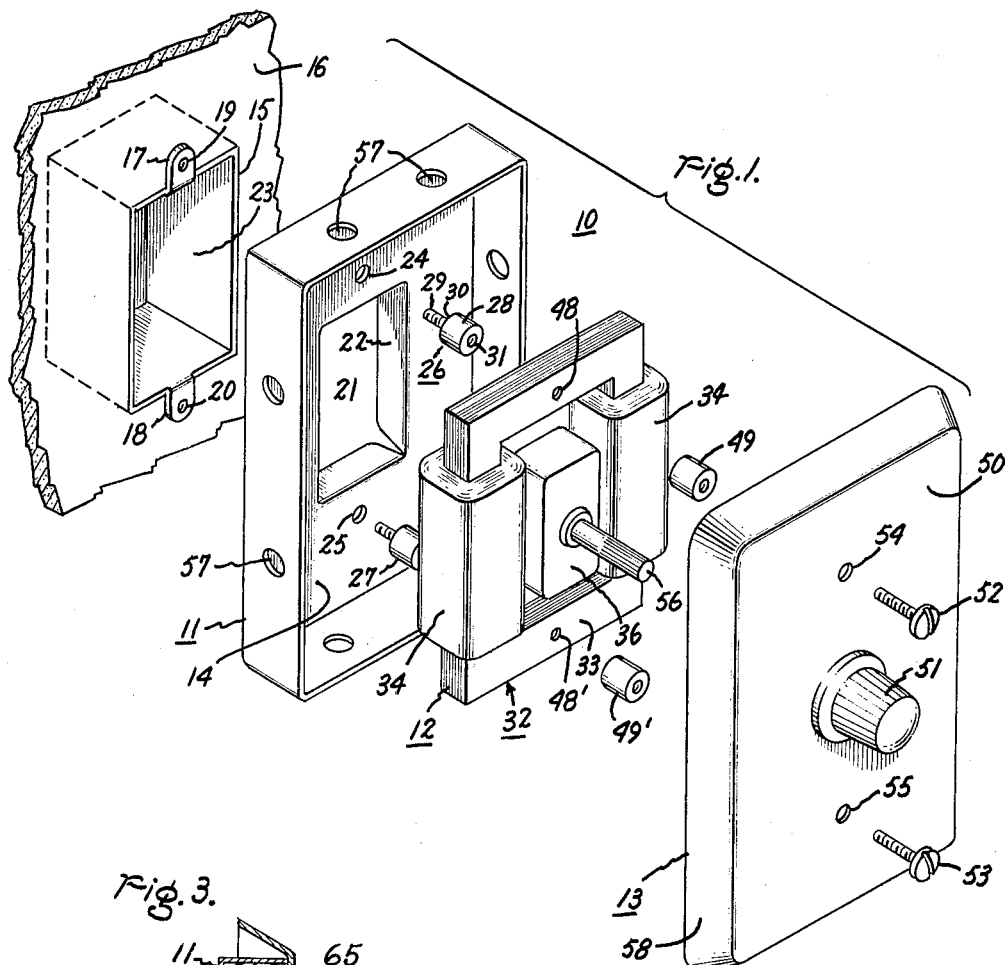
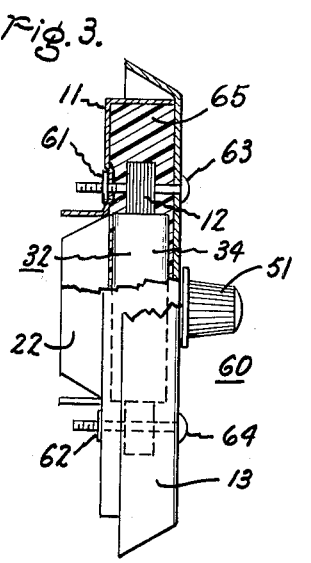
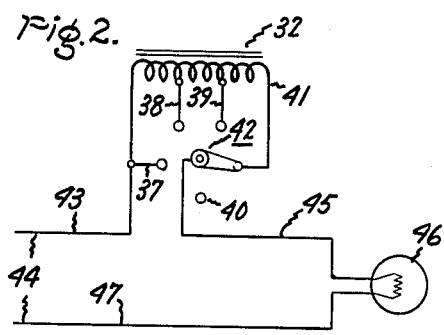
Inventor:
Carlyle S. Herrick,
by James J. Lichiello
His Attorney.

United States Patent Office 3,212,038
Patented Oct. 12, 1965

3,212,038
WALL MOUNTED LIGHT DIMMING VARIABLE REACTOR DEVICE
Carlyle S. Herrick, Alplaus, N.Y., assignor to General Electric Company, a corporation of New York
Filed Feb. 1, 1963, Ser. No. 255,475
4 Claims. (Cl. 336—61)

This invention relates to a wall mounted electric lamp dimming device wherein a variable reactor is employed to vary the level of illuminations of a light source. More particularly this invention relates to a prescribed arrangement of, a reactor, a switch, and enclosure assembly, and their attachment to an existing wall mounted electrical outlet box.

Various electric light dimming devices are available which will provide varying levels of illumination of an existing light source. Some of these devices require extensive and also expensive modification of existing circuitry or wall mounting means in order to position or mount the light dimming device in existing structures. Alternatively some of these devices, particularly the silicon diode type, do not provide a sufficient number of different levels of illumination, and their modifications such as additional silicon diodes in the circuit are an economic deterrent. The continuously variable transformer as one solution is disadvantageous, because of its relatively large size and weight which makes new mounting very difficult for the average home owner, and because of its excess heat generating capacity which precludes its mounting within a standard electrical outlet switch box which is about 3 inches length and 2 inches width.

Accordingly, it is an object of this invention to provide an improved variable illuminating control device.

It is another object of this invention to provide an improved variable control device which is wall mounted at existing wall outlet boxes for illumination varying purposes.

It is still another object of this invention to provide a core wound reactor as a light source illumination varying means and which has predetermined multiple positions of illumination levels.

It is yet another object of this invention to provide an improved cooling arrangement for a core wound wall mounted transformer utilized to vary the illumination of a given electric lamp source.

It is another object of this invention to provide an improved mounting assembly and arrangement for a variable illuminating device utilizing a core wound transformer.

Briefly described this invention includes a relatively flat sheet metal enclosure, larger than an existing wall electric outlet box, wherein a multiple tap transformer and switch is positioned. A cover plate is also joined to the enclosure to cover the switch and transformer. The unit is mounted on an existing wall outlet box in heat exchange relationship therewith. One preferred embodiment utilizes a heat conductive potting compound in said enclosure about the switch and transformer.

This invention will be better understood when taken in connection with the following description and the drawings in which:

FIG. 1 illustrates a preferred assembly relationship of one embodiment of this invention;

FIG. 2 illustrates, schematically, a preferred circuitry relationship for the transformer device of this invention; and FIG. 3 illustrates an additional modification of this invention.

Referring now to FIG. 1, there is illustrated an enclosure assembly 10 as one preferred embodiment of this invention. Assembly 10 includes the basic elements of a relatively flat enclosure 11, a transformer type of variable reactor and switch arrangement 12, and a cover plate 13. Enclosure 11 and cover plate 13 when assembled cooperate to define a housing to contain the reactor and switch arrangement 12. The relative positions of elements 11 and 13 when assembled may be seen in FIG. 3 wherein is also disclosed a unitary assembly of this invention. The outline of the enclosure 11 may be of various pleasing shapes, such as a square, rectangle, octagon, etc. In one preferred embodiment of the invention, enclosure 11 is a shallow rectangular sheet metal enclosure provided with an open front and a closed rear surface or wall 14. The rectangular dimensions of enclosure 11 are substantially larger than the standard switch box to which enclosure 11 is particularly adaptable to be joined. These wall mounted electrical outlet boxes are generally found in residential structures, and a typical outlet box measuring about 3 inches length and 2 inches width is illustrated in FIG. 1 as box 15 mounted in a room wall 16. Box 15 is provided with upstanding ear portions 17 and 18 which in turn are provided with threaded apertures 19 and 20. Apertures 19 and 20 are ordinarily employed to affix a switch to box 15. In the present invention they are employed to attach assembly 10 to box 15 as will be hereinafter described.

In order to more effectively join enclosure 11 to wall box 15, the rear surface or wall engaging surface 14 of enclosure 11 includes an opening 21, which has been defined by striking lip portions 22 from surface 14. There is thus provided a rectangular opening 21 of similar size to the opening 23 of the outlet box 15. Projecting lip members 22 which also may be formed as biasing members, slide into opening 23 of box 15 and engage the sides thereof for support, heat transfer, and safety grounding purposes. In one preferred form of this invention lips 22 originate from an opening 21 which is slightly larger than the wall box opening 23 and are provided with a slight taper inwardly towards a distant apex. Thus the projecting ends of the lips 22 are easily inserted into the opening 23 while at some point the sides of lips 22 engage the sides of box 15.

Surface 14 of enclosure 11 also includes a pair of apertures 24 and 25 which, when the enclosure 11 is positioned adjacent wall box 15, are in concentric alignment with the threaded apertures 19 and 20 of upstanding ears 17 and 18. Therefore, enclosure 11 is adapted for attachment to an existing wall box. Specific attachment, in addition to the engagement of lip portions 22 with box 15, is obtained by means of special screw members 26 and 27 each of which is similar to the other. A screw member, 26 for example, includes a generally cylindrical body portion 28 having an extended threaded portion 29 at one end thereof which defines a shoulder 30, and a hollow threaded portion 31 within the body 28. It can be seen that the threaded portion, for example 29, of a screw member 26 passes through aperture 24 of enclosure 11 and threadedly engages a threaded aperture 17 in ear 19 of box 15. Shoulder 30 provides positive attachment of enclosure 11 to box 15. At the same time internal threaded portion 31 of screw members 26 and 27 are available for additional element mounting purposes.

The mounting of metallic enclosure 11 in metal to metal contact with outlet box 15 provides additional radiating surfaces for the purpose of dissipating heat which is developed from the use of a reactor or transformer therein.

A reactor device 32 which is shown schematically in FIG. 1 includes an iron core loop 33 with suitable electrical windings 34 thereon. Such a reactor is preferably a standard type of transformer having plural taps. For the present purpose, this transformer is not of the continuously variable type because of heat generation at low illumination levels and because very low, and very high levels (below maximum) are not necessary. Therefore, partial illumination levels of 20%, 40%, and 60% of full intensity are preferable. A further preferred arrangement is 20% and 50% of full intensity. The loop of the transformer may be chosen to be of those dimensions as to encircle a given wall box opening for good heat dissipation. Where this invention is to be attached to a wall having a single wall box outlet, the loop may be relatively large. Where the wall contains a plurality of side by side mounted boxes, the loop is made narrower so as not to interfere with adjacent switches, outlets, etc. The transformer 32 may have one or more windings 34 extending continuously along the loop so that depth of winding is minimized.

In order to provide a pleasing appearance and minimize projection from the wall, the transformer taps and an on-off switch are utilized in a central assembly 36 which is fitted within the transformer loop. A schematic circuitry diagram of the electrical connections is given in FIG. 2. In FIG. 2, the transformer 32 is illustrated with three taps 37, 38, and 39 for the three levels of illumination 20%, 40%, and 60% of maximum, together with leads 40 and 41 for off and maximum values. These taps and leads are connected to a rotary type electrical switch 42 which includes only the steps indicated. An electrical lead 43 connects the transformer 32 to a source of electrical power 44 which is of 110–115 volts as generally employed in residential lighting. An electrical lead 45 then connects the switch (which is connected to the transformer as previously described) to a light source denoted generally at 46. As a return line, electrical lead 47 connects light source 46 to the power source 44. It can be seen that rotating the switch pointer, i.e. turning shaft 56, will connect different inductances into the lighting circuit. As a replacement item leads 43 and lead 47 (as parted and connected together) are found in the existing wall outlet box 15. Therefore, only two leads denoted as 43 and 45 extend from the transformer to be connected into the existing wiring in box 15. Lead 47 is of course also connected into the existing lamp circuit. Such leads need only be in the form of a screw or other type permanent connector instead of a wire lead.

Referring again to FIG. 1, reactor loop 33 is provided with suitable attaching means such as apertures 48 and 48' therein. With the reactor 32 positioned within the enclosure 11 and resting on screws 26 and 27, the cover plate assembly 13 is attached. Cover plate assembly 13 includes a decor matching cover 50, a switch knob 51, and screws 52 and 53. Cover 50 fits over enclosure 11, but is spaced from wall 15. Openings 54 and 55 of cover 50 are concentrically positioned with apertures 48 and 48' of transformer 32 and consequently also with threaded apertures 31 in screws 26 and 27. Spacers 49 and 49' are utilized between cover 50 and loop 33 to properly space and support cover 50. It can thus be seen that screws 52 and 53 provide engagement of the parts involved as a unitary assembly. With the placement of the cover 50, the knob 51 slides over shaft 56 on the assembly 36. By mounting knob 51 over cover 50 in secured and rotary relationship any undue force thereon is absorbed by the unitary assembly rather than by switch assembly 36. However, a similar mounting may be obtained by positioning switch knob 51 on shaft 56 and utilizing a formed aperture in cover 50 for assembly and force absorbing purposes.

Heat dissipation for the dimmer device of this invention is an important consideration. By the dual connection of enclosure 11 in metal contact with box 15 (through lips 22 and screws 26 and 27), the metal surfaces of box 15 are made available for heat dissipation. In addition these metal surfaces of box 15 are generally exposed to interior wall spaces, which are at a reduced temperature. A further feature is the provision of cool air vents or openings 57 in enclosure 11. Air may thus circulate between cover 50 and wall 15 and through enclosure 11. By the same token box 15 is open to the interior spaces of the wall and air circulation to and from this area through enclosure 11 is obtained. In this respect cover 50 should also be of a good heat dissipating material such as metal. In joining cover 50 to enclosure 11, cover 50 engages the front edges of enclosure 11. Not only is good heat contact relationship thus provided, but also the projecting lip portions 58 of cover 15 then act as heat radiation fins for more effective cooling.

A further modification of this invention is illustrated in FIG. 3. The modification of FIG. 3 relates to a unitary assembly 60. Assembly 60 includes the basic elements 11, 12, and 13 of FIG. 1 joined as an integral unit. The advantages of such a unit are that assembly of parts is eliminated along with the possibilities of error or breakage. In this respect, seperate lock washers 61 and 62 are utilized in appropriate depressions in wall portion 14 of enclosure 11 to threadedly engage a pair of long screws 63 and 64. Screws 63 and 64 are also utilized to attach to the unit 10 to the wall box 15. A further preferred unitary assembly 60 is filled with a well known potting compound 65 such as an epoxy resin. Such potting compounds may include suitable fillers for increased heat transfer purposes.

This invention includes the salient advantages of a high degree of simplicity in mounting, there being only two electrical leads to connect and two screws to be assembled. The average home owner may thus mount this invention, and particularly the FIG. 3 unitary assembly, with no difficulty. No wall modification is necessary nor is there any need in existing structures to mount a special box. This invention provides a light dimming device which is not only easy to position or mount, but one which is also aesthetically pleasing in appearance. The invention also incorporates a high degree of safety with respect to heating and electrical features.

This invention includes an enclosure 11 which is larger than a 3 x 2-inch wall box with the transformer therein approximating the size of the enclosure. It is understood that the invention is also adaptable with greater advantages for mounting on double outlet boxes where available or junction boxes where available. The essence of the invention is to provide as large a transformer assembly as possible, commensurate with space, lighting and heat dissipation requirements, to be mounted on existing boxes usually found in domestic establishments. Thus, the power limitation on this invention is usually under about 300 watts. The upstanding lugs 48 on reactor 32, for larger size reactors, may be of the depending type depending towards the center of the loop of the reactor 32.

While a specific method and apparatus in accordance with this invention has been shown and described, it is not desired that the invention be limited to the particular description nor to the particular configurations illustrated, and it is intended by the appended claims to cover all modifications within the spirit and scope of this invention.

What I claim as new and desire to secure by Letters Patent of the United States is:

1. In a device for controllably varying the power input to an electric light, which device is adaptable for mounting on an electrical outlet box installed in a room wall of a building to receive a standard residential electric light switch, the combination comprising:

(a) a housing having a rear wall with side walls projecting therefrom to form an enclosure, (1) said housing being formed of heat conducting and electrically conducting material and being adapted for mounting on an electric outlet box with said rear wall thereof being substantially flush with the room wall surface, (b) a loop-type transformer having a core loop,
(c) means for mounting said transformer in said housing and directly conducting heat from said core loop to said housing,
   (1) said mounting means also being electrically conductive,
(d) a multiple position switch located within said core loop and adapted to be actuated from outside said housing,
(e) a plurality of taps on said transformer,
(f) a plurality of lip portions formed integral with and protruding from said rear wall of said housing for insertion into said outlet box in direct contact with the inner walls thereof when said housing is mounted on said outlet box whereby heat will be transferred from said housing directly to said outlet box, and said housing will be held in alignment relative to said outlet box and will be electrically grounded thereto.

2. The device for controllably varying the power input to an electric light substantially as recited in claim 1 wherein the internal volume of the housing when mounted on a wall box is in communication with the internal volume of said wall box.

3. The device for controllably varying the power input to an electric light substantially as recited in claim 1 wherein the means for mounting the transformer and transferring heat from the core loop to the housing consists of a heat conducting potting compound contained in the interior of said housing in contact with the transformer.

4. The device for controllably varying the power input to an electric light substantially as recited in claim 1 wherein additional cooling is effected by air vents provided in the side walls of the housing to allow room air to circulate in the housing.

References Cited by the Examiner

UNITED STATES PATENTS

| | | | |
|---|---|---|---|
| 2,038,075 | 4/36 | Edwards | 336—59 |
| 2,677,810 | 5/54 | Lennox | 336—148 |
| 2,740,905 | 4/56 | Henderson | 317—99 X |
| 2,805,367 | 9/57 | Burski | 317—15 |
| 3,058,020 | 10/62 | Balan | 174—55 X |

JOHN F. BURNS, *Primary Examiner.*

E. JAMES SAX, *Examiner.*